Nov. 8, 1949     P. A. PITT ET AL     2,487,176
SYSTEM FOR RECOVERING WATER FROM EXHAUST GAS
Filed April 24, 1945
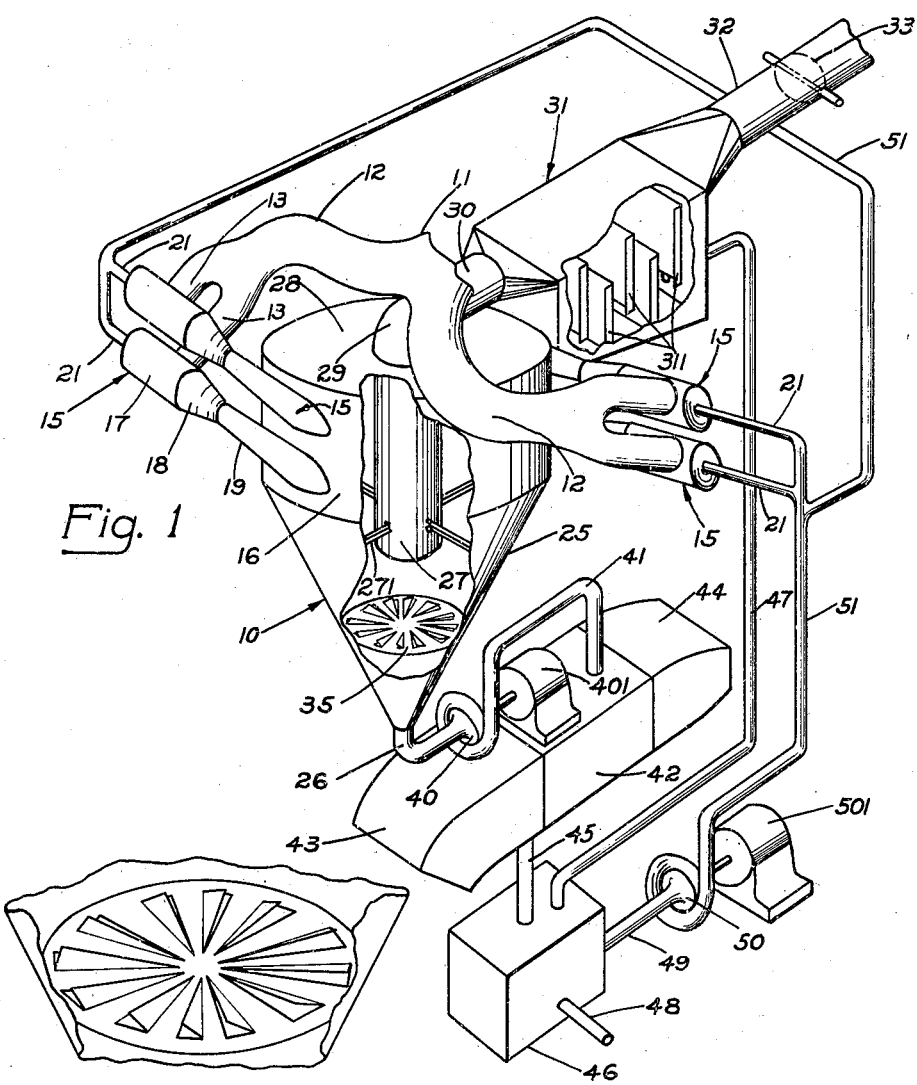
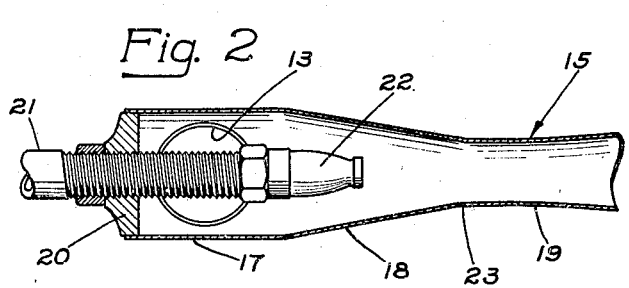
INVENTORS.
PAUL A. PITT.
CLARENCE O. MOE.
BY
ATTORNEY.

Patented Nov. 8, 1949

2,487,176

UNITED STATES PATENT OFFICE 2,487,176

SYSTEM FOR RECOVERING WATER FROM EXHAUST GAS

Paul A. Pitt, San Diego, and Clarence O. Moe, Chula Vista, Calif., assignors to Solar Aircraft Company, San Diego, Calif., a corporation of California Application April 24, 1945, Serial No. 590,036

2 Claims. (Cl. 183—21)

1

This invention relates to the condensation and recovery of water vapor from gases, and is particularly applicable to the recovery of the water of combustion from the exhaust gas of an aircraft engine.

High efficiency, high duty, internal combustion engines such as are employed on aircraft must operate at relatively high compressions very near the knocking or detonating point. For best efficiency, the compression is so chosen with relation to the operating temperature and octane rating of the fuel employed that the detonating point is approached very closely during normal operation of the engine with optimum mixture of fuel and air for high efficiency. As a result, when the engine must be operated at greater power output than normal, knocking results unless some other factor is introduced to prevent it.

It is well known that knocking can be prevented under excessive load by enriching the fuel mixture, and it has been common practice to prevent knocking by enriching the mixture when the engine must be operated under maximum load for relatively short periods of time. However, this method is objectionable for several reasons, one of which is the excessive fuel consumption. A rich mixture reduces the tendency toward knocking because of the cooling effect of the excess fuel that is introduced into the cylinders, and it is known that this cooling effect can be obtained by introducing liquids other than fuel. One such liquid is water, and it is known that the introduction of water or water vapor along with the fuel functions effectively to prevent knocking.

Heretofore, however, it has often been impractical to use water for this purpose because of the weight of the water that would have to be carried on a flight of appreciable length.

Our invention is primarily for the purpose of providing water on an aircraft for use in the engines to control knocking, and we obtain this water by recovering it from the exhaust gas of the engines. The water present in the exhaust gas of an engine results from the combustion of hydrogen in the fuel with oxygen from the air used to burn the fuel, and the total amount of water resulting from combustion is somewhat in excess of the fuel consumed, with fuels that are in common use.

An object of the present invention is to provide a practicable apparatus for use on aircraft for recovering substantial water from the exhaust gas of the engines.

A more specific object is to provide an apparatus for recovering water from exhaust gas of

2 internal combustion engines, which apparatus is light enough to permit its advantageous use on aircraft.

Another object is to provide relatively compact apparatus for recovering water from the exhaust gas of internal combustion engines.

Briefly, we attain the foregoing objects by aspirating exhaust gas into a precipitating chamber by means of a spray of cool water, causing the mixture of spray water and exhaust gas to rotate rapidly in the precipitating chamber to effect separation of water from the gas by centrifugal action, discharging the residual exhaust gas from the chamber at super-ambient pressure, withdrawing the water from the precipitating chamber, further cooling a portion of the water in a heat exchanger cooled by the ambient air, and recirculating the cooled water under substantial pressure to the spray means.

Two results are achieved by aspirating the wet exhaust gas into the precipitating chamber with jets of the cooling water. One result is the intimate mixture of the cooling water with the exhaust gas to chill the latter below the dew point and cause condensation of the water vapor in the gas. The other result is the introduction of exhaust gas into the precipitating chamber at a pressure substantially above the ambient pressure without building up undesirable back pressure in the exhaust line. We have found that the proportion of the water that can be condensed from the exhaust gas at a given temperature increases rapidly with the pressure, so that a substantial increase in the amount of water recovered from the exhaust is had by maintaining the pressure within the precipitation chamber above the ambient pressure.

A full understanding of our invention may be had from the following detailed description which refers to the drawing, in which:

Fig. 1 is a perspective view with parts broken away showing one embodiment of the invention;

Fig. 2 is an enlarged perspective view showing a portion of the precipitating chamber; and Fig. 3 is a longitudinal sectional view through one of the spray units employed in Fig. 1.

Referring to Fig. 1, there is shown a precipitating chamber in the form of a cyclone separator 10 into which wet exhaust gas and water are introduced and from which residual exhaust gas and water are separately withdrawn. The wet exhaust gas is supplied from the engines through an exhaust pipe 11 which feeds into a pair of branch pipes 12—12 which extend to diametrically opposite sides of the cyclone 10. Each branch 12 is further sub-divided into two branches 13—13 which feed into the sides of separate aspirating units 15. The two aspirating units associated with one of the branches 12 are horizontally positioned, one above the other, and extend into an upper cylindrical side wall portion 16 of the cyclone 10 tangentially. The other two aspirating units associated with the other branch 12 are similarly positioned with respect to each other but are connected to the side wall 16 at a diametrically opposite point and are directed oppositely so that the fluid introduced into the cyclone through all of the units 15 causes the mixture to whirl in one direction within the cyclone.

The aspirating units 15 act as boosters to assist the exhaust gas from the branch pipes 13 into the cyclone, so that an appreciable pressure can be maintained within the cyclone without introducing back pressure in the exhaust line 11 extending from the engine. The motive power employed to pump the gas is water under pressure supplied to jets within the aspirators 15.

It will be observed from inspection of Fig. 1 that each aspirator 15 consists of a rear cylindrically tubular portion 17, an intermediate contracting transitional portion 18 and an expanding portion 19, the outer end of which opens through the wall 16 of the cyclone.

Referring now to Fig. 3, there is extended through the rear end wall 20 of each unit 15 a water pipe 21 which terminates in a spray nozzle 22 positioned within the contracting portion 18 of the aspirator.

The nozzle 22 is preferably designed to produce a cone-shaped spray such that the water issuing therefrom is broken up into very fine particles and directed at very high velocity into the throat portion 23 of the aspirator which is located at the junction of the contracting portion 18 with the expanding portion 19. The water spray entraps and carries with it exhaust gas entering through the branch 13, which gas is discharged at high velocity through the throat 23 of the aspirator and at the same time is thoroughly intermixed with the finely divided water.

The exhaust gas is almost immediately cooled by contact with the water, the water being simultaneously heated, so that the mixture is at a common temperature intermediate the temperatures of the spray water and the exhaust gas as it entered through the branch 13. The temperature and quantity of spray water are so chosen as to bring the mixture to a temperature at which a substantial portion of the water vapor originally present in the exhaust gas is condensed.

Because of the high velocity of the mixture as it passes through the throats 23 of the aspirating tubes, the pressure is reduced, but as the mixture moves on through the expanding portion 19 of each aspirator, the velocity is reduced and the pressure correspondingly increased. After discharge of the mixture from the aspirating units into the cyclone 10, the velocity is further reduced and the pressure is correspondingly increased.

As previously indicated, the exhaust gas is so thoroughly mixed with the spray water in the aspirating tubes 15 that substantially all of the exhaust gas is reduced immediately to a temperature very near the final temperature it reaches within the cyclone 10, so that most of the water vapor is immediately condensed. A large portion of the condensed water vapor mixes immediately with the spray water and the rest separates in the form of small droplets suspended in the gas. Because of the fact that the mixture is introduced tangentially into the cyclone 10, the mixture rotates rapidly within the cyclone and the resultant centrifugal force throws the bulk of the water against the peripheral walls, including the upper cylindrical wall 16 previously mentioned and a lower conical wall 25 which extends downwardly and inwardly from the lower edge of the wall 16 to a water discharge pipe 26 connected to the lower end or apex of the conical section. As the condensed water flows down the walls of the cyclone, it enters the pipe 26 and is circulated in a manner to be described later.

The residual exhaust gas that is separated from the solid water migrates toward the center of the cyclone and enters the lower end of an outlet pipe 27 which extends up through the top wall 28 of the cyclone and is connected by an elbow 29 to a horizontal pipe 30 which connects to the inlet end of a secondary separator 31, the outlet of this separator being connected to a discharge pipe 32, the outlet of which discharges into the atmosphere. This discharge pipe 32 may contain a damper valve 33 for regulating the rate of discharge of the residual gas and thereby controlling the pressure existing within the cyclone 10.

As has been previously explained, greater water recovery is obtained at high pressures within the cyclone 10 than at low pressures, and the damper 33 is preferably adjusted to maintain the pressure within the cyclone as high as is possible without introducing back pressure into the exhaust line 11. Hence the resistance afforded by the flow of the residual gas through the pipe 27, elbow 29, pipe 30, secondary separator 31, and the discharge pipe 32 is preferably such as to just balance the pressure developed in the aspirators 15 and thereby maintain as great a pressure in the cyclone 10 as is possible without introducing back pressure into the exhaust line 11.

The lower end of the pipe 27 may be anchored by means of studs 271 extending radially from this pipe near its lower end to the wall of the cyclone.

We have found it desirable to introduce into the lower portion of the conical section 25 of the cyclone a baffle 35 for facilitating the coalescence of fine water droplets. The baffle has radially extending louvers or fins so inclined relative to the swirling gas in the cyclone that droplets of water in the gas are caught on the under sides of the louvers, where they coalesce and drop to the bottom of the cyclone.

Water entering the pipe 26 from the bottom of the cyclone 10 is delivered by a pump 40 under pressure through a pipe 41 to a radiator 42 which may be of conventional construction and cooled by atmospheric air introduced through a scoop 43 and discharged through a vent member 44, these latter members being so positioned on the aeroplane as to utilize its motion through the air to circulate cooling air through the radiator 42.

From the radiator 42 the cooled water flows through a pipe 45 into a sump 46, which sump also receives water through a pipe 47 from the secondary precipitator 31. The latter preferably contains baffles 311 which force the gas moving therethrough to travel in a tortuous path and effect separation of any particles of water that may be entrained in the gas leaving the cyclone 10.

It is to be understood that the secondary separator 31 is not always essential and can, in many instances, be advantageously eliminated since the separation of the gas from the water within the cyclone 10 may be sufficiently complete.

The sump 46 is provided with two discharge lines 48 and 49. The pipe 48 goes to the apparatus for introducing water into the engines and is preferably located above the bottom of the sump 46, so that it can deliver water only when the supply within the sump exceeds a predetermined minimum amount.

The pipe 49 delivers water from the bottom of the sump 46 to a pump 50 which delivers it under substantial pressure through a pipe 51 to the pipes 21 of the four aspirator units 15.

By virtue of the location of the discharge pipe 48 above the bottom of the sump 46, enough water is always maintained in the system to fully supply the nozzles 22 in the aspirator units 15.

As shown in the drawing, the pump 40 is driven by an electric motor 401 and the pump 50 is shown driven by an electric motor 501. Obviously, however, any available source of power can be used to drive the pumps.

In some installations it may be desirable to dispense with one of the pumps 40 or 50. The pump 40 may be dispensed with if the position of the radiator is below the cyclone, and the sump 46 is below the radiator 42, so that water can flow by gravity from the cyclone through the radiator to the sump, or the pump 50 can be eliminated, and the pump 40 designed to provide sufficient pressure for forcing the water through the radiator and the sump to the jets in the aspirating units. Ordinarily, however, it is desirable to provide substantial pressure in the water line, as this enables the efficient operation of the system with a smaller quantity of circulating water and thereby reduces the total weight. High pressure is desirable to increase the rate of flow through the radiator 42 and to provide high velocity of the water issuing from the nozzles 22 in the aspirating units so as to develop the maximum possible pressure within the cyclone 10.

Although for the purpose of explaining the invention, one application thereof as disclosed in the drawing has been described in detail, various departures from the exact structure shown will be apparent to those skilled in the art, and the invention is to be limited only to the extent set forth in the appended claims.

We claim:

1. In a system for recovering water from the exhaust gas of an internal combustion engine; a precipitating chamber having gas and water outelt passages, means for introducing exhaust gas and cooling water into said precipitating chamber comprising an aspirator having a water jet therein for aspirating exhaust gas into said chamber, and means for supplying water to said jet under substantial pressure, in which said aspirating means comprises a conduit communicating with said precipitating chamber, said conduit being of relatively large cross-section at the point of its juncture with said chamber and at a second point spaced therefrom, and being of reduced cross-section intermediate said points, said water jet being positioned within said second enlarged portion for directing a spray of water through said reduced neck portion toward said chamber, and means for supplying exhaust gas to said conduit on the upstream side of said jet.

2. In a system for recovering water from the exhaust gas of an internal combustion engine; a precipitating chamber having gas and water outlet passages, means for introducing exhaust gas and cooling water into said precipitating chamber comprising an aspirator having a water jet therein for aspirating exhaust gas into said chamber, and means for supplying water to said jet under substantial pressure, in which said precipitating chamber is of circular cross-section in horizontal planes, with said aspirating means positioned to direct exhaust gas and water into said chamber tangentially, said exhaust gas outlet comprising a conduit extending into said chamber and terminating centrally therein, and said water outlet being located at the bottom of said chamber.

PAUL A. PITT.
CLARENCE O. MOE.

REFERENCES CITED

The following references are of record in the file of this patent:

UNITED STATES PATENTS

| Number | Name | Date |
| --- | --- | --- |
| 467,264 | Raymond | Jan. 19, 1892 |
| 714,080 | Whilson | Nov. 18, 1902 |
| 793,885 | Lowe | July 4, 1905 |
| 1,152,381 | Kenney | Aug. 31, 1915 |
| 1,172,429 | Carrier | Feb. 22, 1916 |
| 1,388,480 | Paris, Jr. | Aug. 23, 1921 |
| 1,875,755 | Noyes | Sept. 6 1932 |
| 1,987,604 | Corbett | Jan. 15, 1935 |
| 2,152,251 | Gay | Mar. 28, 1939 |
| 2,222,930 | Arnold | Nov. 26, 1940 |

FOREIGN PATENTS

| Number | Country | Date |
| --- | --- | --- |
| 343,587 | Germany | Nov. 4, 1921 |